(12) United States Patent
Erickson et al.

(10) Patent No.: US 11,577,454 B2
(45) Date of Patent: Feb. 14, 2023

(54) THREE-DIMENSIONAL PRINTING (71) Applicant: HEWLETT-PACKARD DEVELOPMENT COMPANY, L.P., Spring, TX (US)

(72) Inventors: Kristopher J. Erickson, Palo Alto, CA (US); Paul Olubummo, Palo Alto, CA (US); Aja Hartman, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 29 days.

(21) Appl. No.: 16/605,140

(22) PCT Filed: Mar. 15, 2018

(86) PCT No.: PCT/US2018/022667
§ 371 (c)(1),
(2) Date: Oct. 14, 2019

(87) PCT Pub. No.: WO2019/177612
PCT Pub. Date: Sep. 19, 2019

(65) Prior Publication Data
US 2021/0138725 A1    May 13, 2021

(51) Int. Cl.
| | |
|---|---|
| *B29C 64/165* | (2017.01) |
| *B33Y 10/00* | (2015.01) |
| *B33Y 30/00* | (2015.01) |
| *B33Y 70/00* | (2020.01) |
| *B29C 64/291* | (2017.01) |
| *C08K 3/04* | (2006.01) |
| *B29K 105/00* | (2006.01) |

(52) U.S. Cl.
CPC .......... *B29C 64/165* (2017.08); *B29C 64/291* (2017.08); *B33Y 10/00* (2014.12); *B33Y 30/00* (2014.12); *B33Y 70/00* (2014.12); *C08K 3/04* (2013.01); *B29K 2105/005* (2013.01); *B29K 2105/0038* (2013.01)

(58) Field of Classification Search
CPC ..... B29C 64/165; B29C 64/291; B33Y 10/00; B33Y 70/00; B33Y 30/00; B29K 2105/0038; C08K 3/04
USPC ........................................................ 428/412
See application file for complete search history.

(56) References Cited

U.S. PATENT DOCUMENTS

| | | |
|---|---|---|
| 6,790,403 B1 | 9/2004 | Priedeman et al. |
| 2007/0241482 A1 | 10/2007 | Giller et al. |
| 2017/0043535 A1* | 2/2017 | Ng .......................... B33Y 50/02 |

FOREIGN PATENT DOCUMENTS

| | | |
|---|---|---|
| CN | 105835374 | 8/2016 |
| WO | WO-2017112689 A1 | 6/2017 |
| WO | WO-2017196321 A1 | 11/2017 |
| WO | WO-2017196330 A1 | 11/2017 |
| WO | WO-2017196358 | 11/2017 |
| WO | WO-2017207538 | 12/2017 |

* cited by examiner

*Primary Examiner* — Hui H Chin
(74) *Attorney, Agent, or Firm* — HP Inc. Patent Department (57) ABSTRACT

A three-dimensional printing system can include polymeric build material and jettable fluid(s). The polymeric build material can have an average particle size from 20 μm to 150 μm, a first melt viscosity, and a melting temperature from 75° C. to 350° C. In one example, the jettable fluid can include water, from 0.1 wt % to 10 wt % of electromagnetic radiation absorber, and from 10 wt % to 35 wt % of an organic solvent plasticizer. Contacting a first portion of a layer of the polymeric build material with the jettable fluid can provide an organic solvent plasticizer loading from 2 wt % to 10 wt % based on the polymeric build material content. The first melt viscosity of the polymeric build material at the first portion can be reduced and the melting temperature of the polymeric build material at the first portion can be decreased by 3° C. to 15° C.

18 Claims, 5 Drawing Sheets

| forming a 40 μm to 300 μm layer of polymeric build material on a build substrate, wherein the polymeric build material has an average particle size from 20 μm to 150 μm, a melting temperature from 75 °C to 350 °C, and a melt viscosity | 210 |

| selectively jetting an electromagnetic radiation absorber and an organic solvent plasticizer onto a first portion of the layer of polymeric build material so that the first portion is contacted by both the electromagnetic radiation absorber and the organic solvent plasticizer at an organic solvent plasticizer loading from 2 wt% to 10 wt% based on the polymeric build material content | 220 |

| directing electromagnetic radiation to the layer of polymeric build material at a wavelength to cause the radiation absorber at the first portion to raise a temperature of the polymeric build material higher than at areas of the layer of polymeric build material outside the first portion, wherein the first portion of the layer has a modified lower melting temperature as well as a modified lower melt viscosity relative to areas of the layer of polymeric build material outside the first portion due to presence of the organic solvent plasticizer | 230 |

# THREE-DIMENSIONAL PRINTING

BACKGROUND

Methods of three-dimensional (3D) digital printing, a type of additive manufacturing, have continued to be developed over the last few decades. In general, 3D printing technology can improve the product development cycle by allowing rapid creation of prototype models or even finished products in some instances. For example, several commercial sectors such as aviation and the medical industry, to name a few, have benefitted from rapid prototyping and/or the production of customized parts. There are various methods for 3D printing that have been developed, including heat-assisted extrusion, selective laser sintering, photolithography, additive manufacturing, as well as others. As technology advances, higher demands with respect to production speed, part consistency, rigidity, method flexibility, etc., exist with customers.

DETAILED DESCRIPTION

The present disclosure is drawn to three-dimensional (3D) printing systems and methods. More particularly, the systems and methods can be used with light area processing (LAP) or multi-jet fusion (MJF) where polymer build material (particulate or powder) is spread on a powder bed support on a layer by layer basis. The various layers are contacted with jetting fluid(s) which include an electromagnetic radiation absorber and an organic solvent plasticizer. These two components can be formulated in a common aqueous liquid vehicle, for example, or can be formulated in separate aqueous liquid vehicles. In either case, the electromagnetic radiation absorber and the organic solvent plasticizer can be applied together to a layer of the polymeric build material at a first portion thereof (leaving another portion of the layer uncontacted by the electromagnetic radiation absorber and the organic solvent plasticizer). The jetting fluid(s) can be ejected from a print head, such as a fluid ejector similar to an inkjet print head, for example, and then the layer (both the first portion as well as other portions) can be exposed to electromagnetic radiation to heat the layer of the build material, more so at the first portion. This can be repeated layer by layer until a three-dimensional object is formed. Thus, the layer of polymer build material, including the first portion and other portions can be essentially indiscriminately exposed to electromagnetic radiation, but due to the presence of the electromagnetic radiation absorber, the absorbed light energy at the first portion of the layer is converted to thermal energy, causing the first portion to melt or coalesce, while other portions do not melt or coalesce. Furthermore, in accordance with examples of the present disclosure, due to the presence of an organic solvent plasticizing agent, the first portion exhibits a reduced melt viscosity and melting temperature compared to neat or native polymer build material outside of the first portion.

In accordance with this, the present disclosure is drawn to a three-dimensional printing system that can include a polymeric build material having an average particle size from 20 μm to 150 μm, a first melt viscosity, and a melting temperature from 75° C. to 350° C. The system can also include a jettable fluid including water, from 0.1 wt % to 10 wt % of electromagnetic radiation absorber, and from 10 wt % to 35 wt % of an organic solvent plasticizer. Thus, the jettable fluid is both a fusing fluid and a plasticizing fluid. Upon contacting a first portion of a layer of the polymeric build material with the jettable fluid to provide an organic solvent plasticizer loading from 2 wt % to 10 wt % based on the polymeric build material content, the first melt viscosity of the polymeric build material at the first portion can be reduced to a second lower melt viscosity, and furthermore, the melting temperature of the polymeric build material at the first portion can be decreased by 3° C. to 15° C.

In another example, a three-dimensional printing system can include a polymeric build material having an average particle size from 20 μm to 150 μm, a first melt viscosity, and a melting temperature from 75° C. to 350° C. The system can also include a jettable fusing fluid including water and from 0.1 wt % to 10 wt % electromagnetic radiation absorber and a (separate) jettable plasticizing fluid including water and from 10 wt % to 35 wt % of an organic solvent plasticizer. Upon contacting a first portion of a layer of the polymeric build material with the jettable fusing fluid and the jettable plasticizing fluid (providing an organic solvent plasticizer loading from 2 wt % to 10 wt % based on the polymeric build material content), the first melt viscosity of the polymeric build material at the first portion can be reduced to a second lower melt viscosity and the melting temperature of the polymeric build material at the first portion is decreased by 3° C. to 15° C.

In either of these three-dimensional printing systems, whether the electromagnetic radiation absorber and organic solvent plasticizer are in a common jetting fluid, or in two separate jetting fluids, there can be several other features that can be utilized in either system. For example, the electromagnetic radiation absorber can be an infrared-absorbing colorant, a near-infrared-absorbing colorant, or an energy-absorbing colorant within the visible spectrum, e.g., a carbon black pigment. In another example, the three-dimensional printing systems can further include an electromagnetic radiation source that can direct electromagnetic radiation toward a top layer of the polymeric build material. The electromagnetic radiation source can emit a wavelength of energy to generate added heat using the electromagnetic radiation absorber, for example, which can cause the area printed therewith to generate more heat than areas outside of the printed region (of both electromagnetic radiation absorber and organic solvent plasticizer). In further detail, the organic solvent plasticizer can be p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, or a mixture thereof. The polymeric build material can be nylon 6, nylon 8, nylon 9, nylon 11, nylon 12, nylon 66, nylon 612, nylon 812, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, and copolymers thereof. In some examples, the polymeric build material at the first portion of the layer when loaded 0.05 wt % to 2 wt % of the electromagnetic radiation absorber (as well as the 2 wt % to 10 wt % of the organic solvent plasticizer), based on the polymeric build material content, can exhibit a $T_{max}$ over-fusing temperature and a temperature processing window that extends from the $T_{max}$ over-fusing temperature to from 5° C. to 20° C. below the $T_{max}$ over-fusing temperature.

In another example, a method of three-dimensional printing can include forming a 40 μm to 300 μm layer of polymeric build material on a build substrate, and selectively jetting an electromagnetic radiation absorber and an organic solvent plasticizer onto a first portion of the layer of polymeric build material so that the first portion is contacted by both the electromagnetic radiation absorber and the organic solvent plasticizer at an organic solvent plasticizer loading from 2 wt % to 10 wt % based on the polymeric build material content. The polymeric build material can have an average particle size from 20 μm to 150 μm, a melting temperature from 75° C. to 350° C., and a melt viscosity. The method can also include directing electromagnetic radiation to the layer of polymeric build material at a wavelength to cause the radiation absorber at the first portion to raise a temperature of the polymeric build material higher than at areas of the layer of polymeric build material outside the first portion, wherein the first portion of the layer has a modified lower melting temperature as well as a modified lower melt viscosity relative to areas of the layer of polymeric build material outside the first portion due to presence of the organic solvent plasticizer. In one example, the melt viscosity of the polymeric build material at the first portion where the electromagnetic radiation absorber and the organic solvent plasticizer are printed can be reduced to a lower melt viscosity and the melting temperature of the polymeric build material at the first portion (where printed) can be decreased by 3° C. to 15° C.

The method can also include preheating the polymeric build material to within 4° C. to 30° C. below the modified lower melting temperature prior to exposing the layer of polymeric build material to the electromagnetic radiation. In further detail, the method can also include adding a second layer of the polymeric build material to the layer of polymeric build material after the layer is melted, selectively applying the electromagnetic radiation absorber and the organic solvent plasticizer onto a second portion of the second layer of polymeric build material, and directing the electromagnetic radiation to the second layer of polymeric build material, similar to that described with respect to the earlier applied layer there-beneath. In one example, the organic solvent plasticizer can have a vapor pressure from 0 mmHg to 25 mmHg at 170° C. In another example, electromagnetic radiation absorber and the organic solvent plasticizer can be selectively applied to the layer of polymeric build material from separate jettable fluids, e.g., from separate fluidjet pens. The method can also use some of the same electromagnetic radiation absorbers, organic solvent plasticizers, and polymeric build material described herein.

Figure 1:
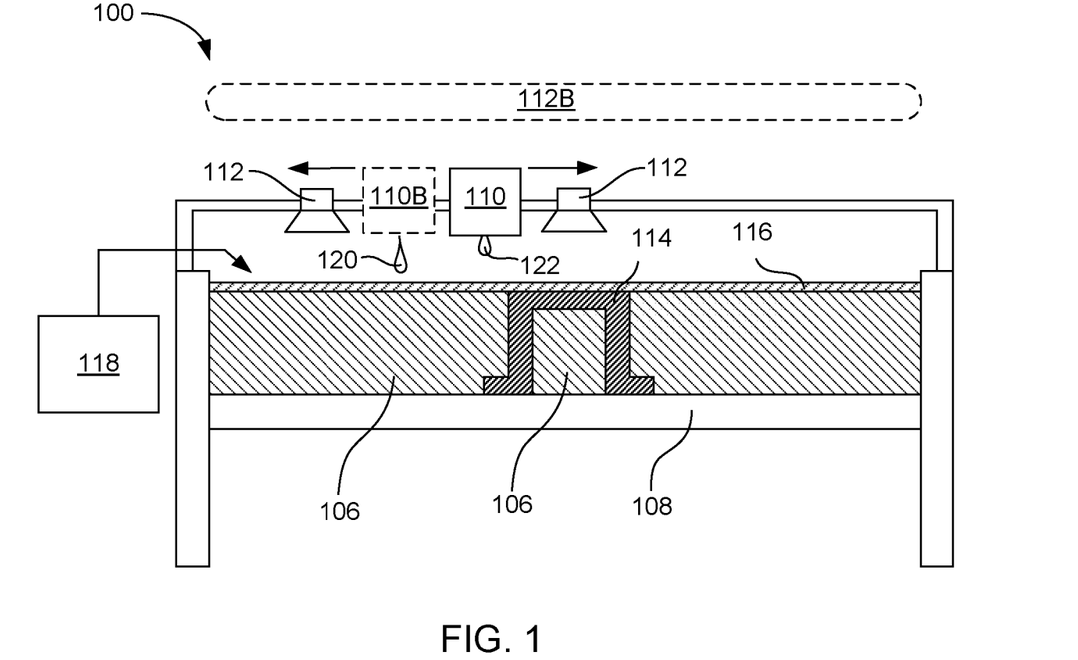
FIG. 1 illustrates an example three-dimensional printing system in accordance with the present disclosure.

It is noted that when discussing the three-dimensional printing systems and methods of the present disclosure, each of these discussions can be considered applicable to other examples, whether or not they are explicitly discussed in the context of that example. Thus, for example, in discussing a polymer build material related to the three-dimensional printing systems, such disclosure is also relevant to and directly supported in context of the other systems and methods, and vice versa In further detail, an example three-dimensional printing system is shown at 100 in FIG. 1 and can include a polymer build material 106 (sometimes referred to as a powder bed), a powder bed support 108 or platform (typically with side walls to hold the powder build material therein), a fluid ejector 110, an electromagnetic radiation source 112 (shown as two lamps that can travel laterally by carriage along with the fluid ejector), and a powder material source 118, for example. Also shown is a second fluid ejector 110B (which can carry a second jettable fluid) and a second electromagnetic radiation source 112B (which in this example can be a static lamp that does not move laterally). For reference, a printed article 114 is shown in FIG. 1 that can be printed using a layer by layer printing process. For example, a new "layer" of build material is shown at 116. Also, a jetting fluid 120 is shown as being ejected from fluid ejector 110, and in some instances, a second jetting fluid 122 can also be separately jetted, such as from fluid ejector 110B. The jetting fluid can include both the electromagnetic radiation absorber and the organic solvent plasticizer, or the jetting fluid can include the electromagnetic radiation absorber and the second jetting fluid can include the organic solvent plasticizer, or vice versa. If a jetting fluid contains an electromagnetic radiation absorber and not an organic solvent plasticizer, it can be referred to more specifically as a "jettable fusing fluid." Likewise, if a jetting fluid contains an organic solvent plasticizer and does not include the electromagnetic radiation absorber, it can be referred to more specifically as a "jettable plasticizing fluid." Either can be referred to more generically as "jetting fluids" and fluids that include both can also be referred to as "jetting fluids."

As shown, the powder bed support 108 and the layers of built up polymer build material 106 can support each layer of the article during the build process. For example, the powder source can spread a thin layer 116 of polymer build material, e.g., from 20 μm to 150 μm, on the powder bed support or previously applied polymer build material layers. Then, the fluid ejector(s) can eject a jettable fluid(s) over selected surface regions of the powder bed material. The electromagnetic radiation source can provide pulsed or non-pulsed light energy sufficiently intense and wavelength coordinated to generate heat at the polymer build material and jettable fluid. For example, a scanning lamp energy source can be provided with one or more high watt bulbs. Non-limiting bulb examples can range in wattage from 400 watt to 2000 watt, e.g., a pair of 750 watt IR bulbs. The jettable fluid may be a single fluid or may be multiple fluids. In either case, however, the jettable fluid(s) deliver both electromagnetic radiation absorber (or fusing agent) as well as organic solvent plasticizing agent to the polymer build material. A portion of the polymer build material can thus be fused, and areas outside of where the jettable fluid(s) are applied can remain free flowing or essentially free flowing (e.g., they do not become part of the three-dimensional object or part being fabricated). The powder bed support can thus receive the polymer build material, the polymer build material can then be flattened by a roller or other mechanical device, and then after printing, can be printed upon and fused to allow for the formation of subsequent layers of the article to be built on top of one another. The fluid ejector can be operable to selectively deposit the jettable fluid(s) onto the polymer build material contained in or on the substrate. The fluid ejector can be operable to selectively apply a pattern of the jettable fluid(s) on to the polymer build material. As mentioned, the three-dimensional printing system can include multiple fluid ejectors, such as when there are multiple fluids to be applied to the polymer build material. The fluid ejector(s) can be any type of printing apparatus capable of selectively applying the jettable fluid(s). For example, the fluid ejector(s) can be an inkjet applicator (thermal, piezo, etc.), a sprayer, etc.

In further detail, the electromagnetic radiation source (or light source) can generate a pulse energy that can be sufficient to melt or fuse a portion of the large polymer build material, but not so much as to fuse areas that are not first contacted by the jettable fluid(s). The pulse energy can be such that heat is generated within a broader temperature processing window compared to systems without the inclusion of an organic solvent plasticizer at concentrations and weight ratios relative to the polymer build material described herein. In further detail, LAP or MJF three-dimensional printing may typically be implemented using tightly controlled thermal processes with relatively small thermal processing tolerance windows in order to produce consistent, high-density, high quality parts. Outside of these narrow tolerance windows, which can be introduced by thermal inhomogeneity across a polymer build material layer, part inconsistency can occur. Some causes of thermal inhomogeneity can include colder edges at the build bed substrate, inhomogeneities in lamp irradiance upon the build bed substrate, inhomogeneities of powder height and packing across the build bed substrate, printing related effects such as part size and separation distance, etc. These inconsistencies can affect part fusing, density, mechanical properties, etc. In accordance with examples herein, organic solvent plasticizer can be included with a jettable fluid (either with an electromagnetic radiation absorber or in a separate jettable fluid) to reduce the viscosity of a polymer melt and also reduce the melting point of a target polymer, e.g., the polymer build material being used.

Fusing of small polymer particles, e.g., 20 μm to 150 μm average, can be carried out by bringing the polymer particles to a melting point and consolidating the powder into a part through a viscosity reduction, which allows for molten polymer to flow. In the present disclosure, the addition of an organic solvent plasticizer at appropriate concentrations or weight ratios relative to the polymer build material, e.g., from 2 wt % to 10 wt % or from 2.7 wt % to 8 wt % based on the polymeric build material content, can improve powder fusing by increasing selectivity of the polymer build material with plasticizer present compared to polymer build material where no plasticizer is present. Thus, the temperature range for processing the printed part can have a temperature processing window (or fusion window) that is effectively larger, as the melt flow and melting temperature are reduced compared to unprinted powder bed material.

The term "temperature processing window" or "processing window" or "fusion window" refers to the magnitude of the temperature range which is achieved during the hottest part of the print process within which parts can be successfully printed. These terms can be further defined by: i) not being over-fused which can be expressed as having dimensional inaccuracy >3% (swelling) relative to original intended part geometry (no thermal bleed); and ii) being over 95% dense (0.95 density fraction). With the larger processing window, more parts can be successfully printed which have <3% dimensional inaccuracy and >95% density when the "thermal homogeneity window" at the polymer build material is equivalent to or less than the "temperature processing window". "Thermal homogeneity window" can be defined as the difference between the $T_{max}$ and $T_{min}$ temperatures within the area of the print bed inside a ½ inch perimeter from the powder bed support walls. Near the walls is where there tends to be less uniform heating, so the Tmax to Tmin range near the walls is a good place to test whether there is reasonable homogeneity across essentially the entire powder bed. Therefore, if less thermal uniformity of the polymer build material causes a larger "thermal homogeneity window," creating a larger "temperature processing window" by utilizing the approach outlined herein will allow for a larger fraction of parts to be successfully printed, as defined by having <3% dimensional inaccuracy and >95% density.

In further detail, extending the fusion window below the $T_{max}$ (over-fusing) temperature from about 2° C. to about 8° C. provides several practical advantages that can be realized, as described in greater detail hereinafter. Thus, processing temperatures below the melting temperature of the neat (or native) polymer build material to temperatures still above the melting temperature of the polymer build material can be used (due to the presence of the organic solvent plasticizer) to generate higher density parts within a wider temperature range. That being stated, it can still be desirable for temperature processing to be carried out above the melting temperature of the neat polymer build material. Thus, it is the $T_{max}$ (highest) temperature that is to be avoided, which is not the melting temperature, but rather a temperature typically above the melting temperature at which over-fusing occurs. "Over-fusing" can be defined when a manufactured part swells a minimum of 3% in size due to excessive heating. Going above the melting temperature of the neat polymer build material can be beneficial because melt viscosity is strongly correlated with temperature, so heating to below the native polymer melt temperature may provide inferior consolidation or material or part density compared to processes that exceed the melt temperature, but still remain (for the most part where possible) below the $T_{max}$ over-fusing temperature.

To be clear, high-density parts can indeed be prepared without the use of the organic solvent plasticizer, but the temperature processing window and margin for processing error is typically narrower; whereas by adding the organic solvent plasticizer, lower temperatures can be used providing a larger temperature window below the $T_{max}$ over-fusing temperature. Furthermore, even when processing above the typical melting temperature of neat polymer build material, higher density parts can be generated more easily with more room for processing temperature error or temperature variability introduced by the presence of natural inhomogeneities. Furthermore, because of this greater processing temperature range and the reduction of the impact of inhomogeneities, high-density parts can be often formed over a larger region of the build bed substrate (See Examples 2 and 3). In still further detail, the use of organic solvent plasticizer as described herein can allow for better processing of small features within parts in some instances. As higher temperatures (within small temperature processing windows) can be harder to achieve for small features during the build process without large features being "over-fused," the benefits of a reduced melting point and a lower viscosity can allow for higher density parts where even small features can be prepared with good resolution.

As illustrated schematically, coalescence of polymeric build material (or powder bed material) can be understood through a viscoelastic coalescence model where a driving force for coalescence is surface energy reduction. This is illustrated in FIG. 2, and further informed by Formula I, as follows:

$$x^2/\alpha = 1.5(\gamma/\eta) \cdot t \quad \text{(Formula I)}$$

In Formula I, $\gamma$ is surface energy; $\eta$ is viscosity; and t is time. x and $\alpha$ are shown graphically by example in FIG. 2. The dotted lines represent the original size of the particles and the solid lines represent the size of the particles after coalescing or fusing (or while fusing).

Figure 2:
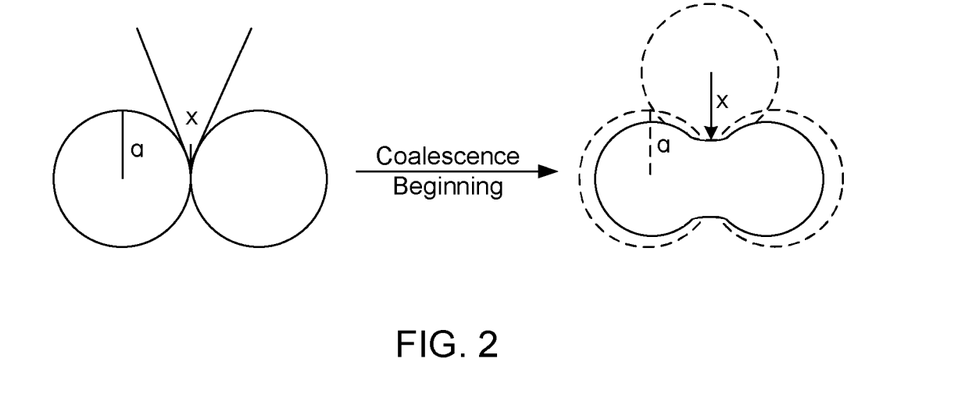
FIG. 2 schematically illustrates a viscoelastic coalescence model in accordance with the present disclosure.
Figure 3:
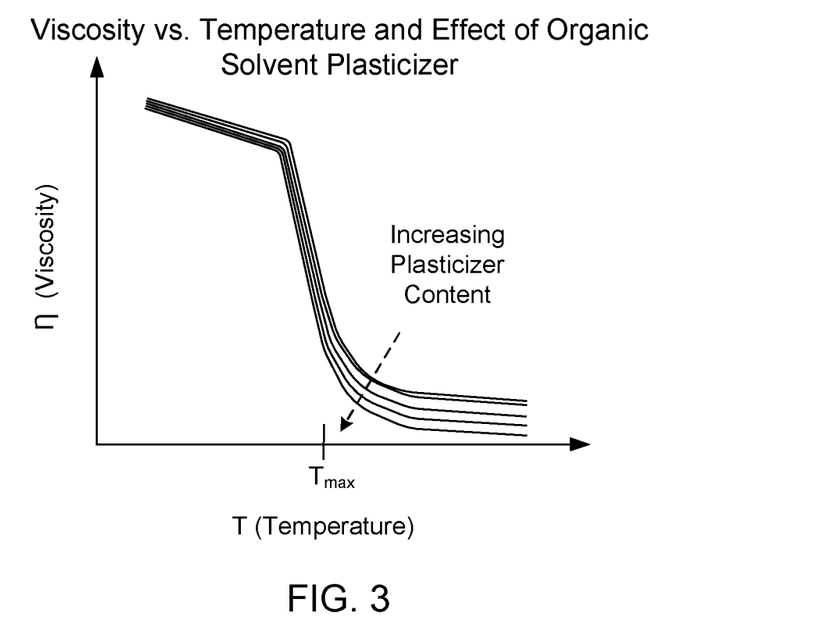
FIG. 3 provides an example graph illustrating the effect of organic solvent plasticizer on viscosity relative to temperature in accordance with the present disclosure.

In further detail, coalescence as shown in FIG. 2 can be restricted prior to melting by the viscosity of the polymer particles. However, when the melting point of a polymer is reached or exceeded, the viscosity tends to drop dramatically, leading to further fusion/coalescence. Thus, in accordance with examples of the present disclosure, the organic solvent plasticizer can work to both decrease the viscosity of the polymer particles of the build material in the melt, as illustrated schematically in FIG. 2, and can also actually decrease the melting point of the polymer, as illustrated in FIG. 3. In further detail, the graph in FIG. 3 can be further described in the context of Formula II, as follows:

$$\text{Organic Solvent Plasticizer Loading promotes}$$
$$\eta \downarrow \therefore \partial x^2/\partial t \uparrow \text{ Improved Coalescence} \rightarrow \text{Density} \uparrow \quad \text{(Formula II)}$$

where $\eta$ is viscosity, $\partial$ is a partial derivative operator, and x is the dimension as shown in FIG. 2.

Figure 4:
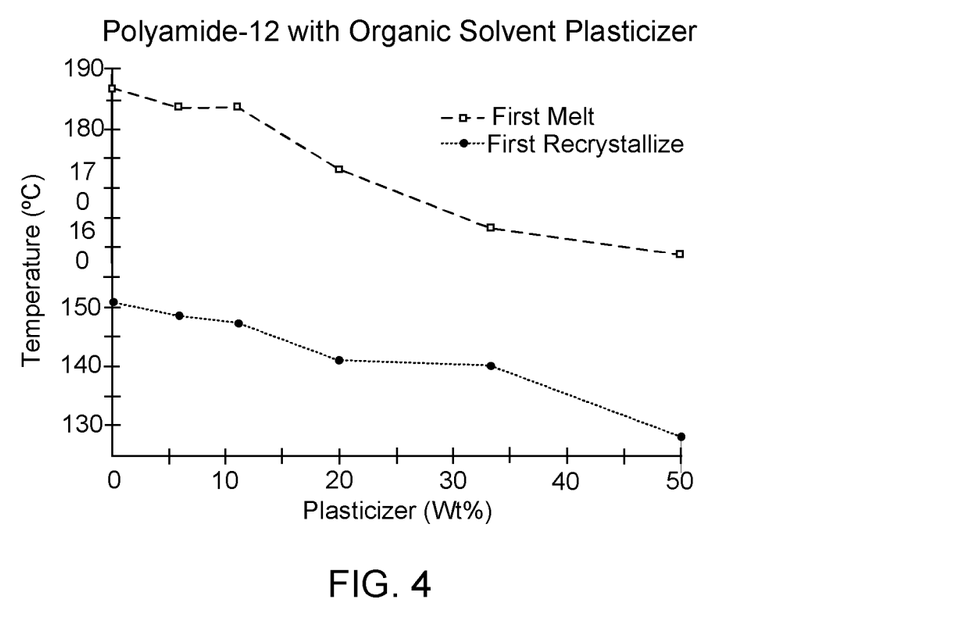
FIG. 4 provides an example illustrating melting temperature of a polyamide-12 relative to increased loading of organic solvent plasticizer in accordance with the present disclosure.

Both mechanisms can work to improve selectivity of voxels (pixels in three-dimensional space with z-axis defined by the build material layer depth) having organic solvent plasticizer applied thereto, thereby increasing the fusing and density of the parts, even at lower temperatures and/or a wider temperature processing window than may otherwise be available. FIGS. 3 and 4 illustrate these improved processing properties further. The number values provided therein are by example only to illustrate the concepts of reduced melt viscosity and melting temperature, and thus, providing the greater temperature processing window and/or lower temperature processing if desired. FIG. 4 specifically provides a polyamide-12 (PA-12 or Nylon-12) example, and that by increasing the concentration of the organic solvent plasticizer, the melting temperature of the build material (as a composite of build material+plasticizer) is reduced and the temperature of recrystallization is also reduced relatively linearly. These weight percentages in FIG. 4 represent the amount of plasticizer in final part. As a further note, the plasticizer used in this example was a toluene sulfonamide, but also included an additional co-solvent, namely 2-pyrrolidone. The 2-pyrrolidone (or other derivatives of 2-pyrrolidone such as N-2-hydroxyethyl-2-pyrrolidone or N-methyl-2-pyrrolidone) can be added as a co-solvent but is not typically used as a plasticizer in accordance with examples of the present disclosure because of its relatively high vapor pressure.

Figure 5:
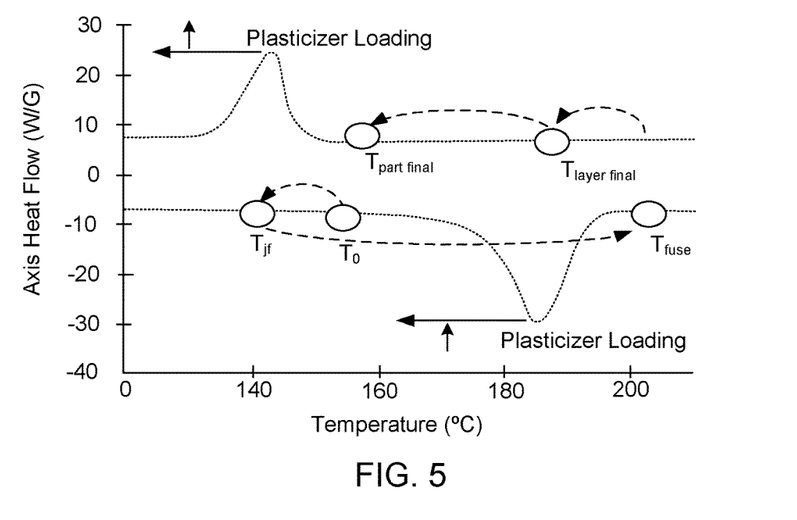
FIG. 5 depicts an example density scanning calorimetry plot in accordance with the present disclosure.

A schematic illustration of these principles is shown in further detail in FIG. 5. There, improved selectivity on voxels process with organic solvent plasticizer compared to voxels without plasticizer applied, e.g., melting temperature ($T_m$) recrystallization temperature ($T_c$) depression. As illustrated, higher loading can be used for more dramatic effect within the weight percentages and weight ratio ranges described herein, e.g., 10 wt % to 35 wt % of an organic solvent plasticizer in the jettable fluid and/or an organic solvent plasticizer loading in the polymer build material at from 2 wt % to 10 wt % (based on the polymeric build material content).

In further detail, FIG. 5 shows a density scanning calorimetry plot with two peaks, one at a higher temperature being the melting peak and one at a lower temperature being the recrystallization peak. In this FIG., $T_0$ designates a temperature at which the layer could begin being processed (or printed) just after spreading. $T_{jf}$ (jetting fluid) refers to the lower temperature of the fluid jet patterned portion of the layer of polymer build material right after jetting fluid is applied. $T_{fuse}$ refers to the temperature after the fusing lamps pass, which may be or would likely be the maximum temperature during the build process. $T_{layer\ final}$ occurs next and represents the temperature prior to the next powder layer being spread thereon. Furthermore, $T_{part\ final}$ refers to the temperature of the part before it is removed from the powder bed (or allowed to slowly cool uniformly). As a note, of the two peaks shown in this scanning calorimetry plot, the higher peak represents a melting peak.

In further detail, it has been found that adding too much plasticizer in the final part can lead to a decrease in some mechanical properties, so a lower loading can be unexpectedly desirable for the purpose of enlarging the temperature processing window while not reducing mechanical properties of the final part. In other words, not very much organic solvent plasticizer loaded in the polymeric build can result in big processing window improvements (while not sacrificing other mechanical properties). For example, loading of organic solvent plasticizer in the polymer build material can be from about 2 wt % to about 10 wt %, for from about 2.7 wt % to about 8 wt %, and these low levels can provide the benefits described herein. Furthermore, applying too much jetting fluid to the polymeric build material can decrease the part temperature too much (generating too much evaporative cooling), so it can make sense to use as much organic solvent plasticizer as may be practical in the jetting fluid and then apply a lower volume of jetting fluid to the polymeric build material. Minimum fluid volumes suitable to sufficiently wet the powder build material to be functional can be established by experimentation. As an example, a range for organic solvent plasticizer in a jetting fluid can be printed at from a 64 to 196 contone level (CL). For perspective, a contone level of 255 is for full black-out printing, which correlates to a 9 pL drop at every 1200 dpi space (along both the x and y axes). These numbers assume the use of the organic solvent plasticizer in a jetting fluid at 21 wt % loading within the fluid (e.g., a mixture of ortho and para-toluene sulfonamide).

In still further detail, if you load too much organic solvent plasticizer into a jetting fluid, the plasticizer may not be soluble enough to stay in solution and will crash out. Thus, in accordance with examples of the present disclosure, the plasticizer content in the jettable (plasticizer) fluid can be from 10 wt % to 35 wt %, from 15 wt % to 30 wt %, or from 20 wt % to 30 wt %. In other examples, if an organic solvent plasticizer is used with a low boiling point/high vapor pressure, e.g., 0 mmHg to 25 mmHg at 170° C., the organic solvent plasticizer may not stay in the part during the build process. Toluene sulfonamide (plasticizer) has a vapor pressure of 0.75 mmHg at 170° C. vs. 317 mmHg for 2-pyrrolidone (co-solvent), meaning a significant amount of the 2-pyrrolidone volatilizes away during printing, whereas toluene sulfonamide does not. Thus, in some instances though 2-pyrrolidone can have a plasticizing effect, it is not considered a plasticizer within the context of the relatively high to high melting temperatures ranges, e.g., 75° C. to 350° C. used herein. That being stated, for simplicity, vapor pressure values can be defined herein as measured at 170 C. Also, as mentioned, the melting temperature of the polymeric build material with the organic solvent can be reduced by from 3° C. to 15° C., from 3.5° C. to 12° C., or from 3.5° C. to 11.3° C., which effectively also enhances the temperature processing window as also discussed. By way of example, with a 2.7 wt % to 8 wt % loading of the toluene sulphonamide (mixture of ortho and para) in the polymeric build material, the melting temperature can be decreased within a range of 3.5° C. to 11.3° C. with nylon 12 (PA 12) polymeric build material and carbon black pigment electromagnetic radiation absorber applied to the same areas at about 0.5 wt %.

Turning now to more detail regarding the materials that can be used in the three-dimensional printing systems and methods described herein, the polymeric build material can be a particulate material or powder, for example. As mentioned, the average particle size can be from 20 μm to 150 μm but can also be from 50 μm to 125 μm, or from 60 μm to 100 μm. Examples of the polymeric build material include semi-crystalline thermoplastic materials with a relatively wide temperature differential between the melting point and re-crystallization, e.g., greater than 5° C. Some specific examples of the polymeric build material in the form of powders or particulates can include polyamides (PAs or nylons), such as nylon 6 (PA 6), nylon 8 (PA 8), nylon 9 (PA 9), nylon 11 (PA 11), nylon 12 (PA 12), nylon 66 (PA 66), nylon 612 (PA 612), nylon 812 (PA 812), and other polyamides. Other specific examples of particulate or powder polymeric build material include polyethylene, polyethylene terephthalate (PET), polystyrenes, polyacrylates, polyacetals, polypropylene, polycarbonate, polyester, acrylonitrile butadiene styrene, thermoplastic polyurethane, other engineering plastics, other high-performance plastics like polyetheretherketone (PEEK), and blends of any two or more of the polymers listed herein, as well as amorphous forms of these polymers where available. Core shell polymer particles of these materials may also be used.

The polymeric build material can have a melting point ranging from about 75° C. to about 350° C., from 100° C. to 300° C., or from 150° C. to 250° C., etc. As examples, the polymeric build material can be a polyamide having a melting point of about 170° C. to 190° C., or a thermal plastic polyurethane having a melting point ranging from about 100° C. to about 165° C. A variety of thermoplastic polymers with melting points or softening points in these ranges can be used. For example, the particulate polymer can be selected from nylon 6, nylon 8, nylon 9, nylon 11, nylon 12, nylon 66, nylon 612, nylon 812, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, and copolymers thereof. In a specific example, the particulate polymer can be nylon 12, which can have a melting point from about 175° C. to about 200° C.

The polymeric build material can be made up of similarly sized particles or differently sized particles. The term "size" or "average particle size" is used herein to describe diameter or average diameter, which may vary, depending upon the morphology of the individual particle. In an example, the respective particle can have a morphology that is substantially spherical. A substantially spherical particle (e.g., spherical or near-spherical) has a sphericity of >0.84. Thus, any individual particles having a sphericity of <0.84 are considered non-spherical (irregularly shaped). The particle size of the substantially spherical particle may be provided by its—diameter, and the particle size of a non-spherical particle may be provided by its average diameter (i.e., the average of multiple dimensions across the particle) or by an effective diameter, which is the diameter of a sphere with the same mass and density as the non-spherical particle.

It is to be understood that the polymeric build material may include, in addition to the polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each from Clariant Int. Ltd. In an example, the charging agent can be added in an amount ranging from greater than 0 wt % to 5 wt % based upon the total wt % of the polymeric build material. Flow aid(s) may be added to improve the coating flowability of the polymeric build material. Flow aid(s) may be particularly desirable when the particles of the polymeric build material are on the smaller end of the particle size range. The flow aid can improve the flowability of the polymeric build material by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid can be added in an amount ranging from greater than 0 wt % to less than 5 wt % based upon the total wt % of the polymeric build material.

To reduce the melt viscosity and the melting temperature of the polymeric build material, and thus enlarge the temperature processing window at which high-density parts can be printed (typically with more high-density homogeneity), as mentioned, the organic solvent plasticizer can be printed at areas typically coincident in location as the electromagnetic radiation absorber. The organic solvent plasticizer can be, for example, p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, or a mixture thereof. The organic solvent plasticizer can be present in the jettable fluid (with or without the electromagnetic radiation absorber) at from 10 wt % to 35 wt %, from 15 wt % to 30 wt %, or from 20 wt % to 30 wt %; and can be delivered to a polymeric build material layer at a loading from 2 wt % to 10 wt %, from 2.7 wt % to 8.8 wt %, or from 3 wt % to 8 wt % based on the polymeric build material content.

The organic solvent plasticizers described herein can have a vapor pressure of less than 25 mmHg, and in one example, less than about 1 mmHg at 170° C., for example. Other organic co-solvents can also be present that may otherwise provide some plasticizing effect, but if the vapor pressure is much above 25 mmHg, then the solvent may be too volatile to stay in the polymeric build material. For example, 2-pyrrolidone, N-2-hydroxyethyl-2-pyrrolidone, N-methyl-2-pyrrolidone, or other more volatile co-solvents can be present in the jetting fluid(s), e.g., in a jetting fluid with both the electromagnetic radiation absorber and the organic solvent plasticizer, or in one or both of the jetting fluids when the electromagnetic radiation absorber and the organic solvent plasticizer are in two separate jetting fluids. 2-pyrrolidone, for example, can be added to work as a humectant for jettability rather than as a plasticizer.

The melting point of the organic solvent plasticizer can also be considered when pairing a polymeric build material therewith. For example, if the melting point is too low relative to the melting point of the polymeric build material, then the organic solvent plasticizer may not mix well with the molten polymeric build material. Thus, for example, the melting point of the organic solvent plasticizer can be selected as having a melting point (Plasticizer $T_m$) within 35° C. below the melting temperature of the polymeric build material (Build Material $T_m$), or in another example, within 15° C. below the melting temperature of the polymeric build material. For example, p-toluene sulfonamide and m-toluene have a melting temperature just below 140° C. (Plasticizer $T_m$=136° C. to 138° C.) and o-toluene sulfonamide has a melting temperature of just below 160° C. (Plasticizer $T_m$=156° C. to 158° C.). Thus, based on the melting temperature of the organic solvent plasticizer, a good choice for the polymeric build material may be a polymer having a melting temperature (Build Material $T_m$) of less than about 173° C. to 193° C., depending on the toluene sulfonamide selected or mixture thereof selected for use; or with tighter tolerances, e.g., having a melting point less than 15° C. below the build material melting temperature, a good choice for the polymeric build material may be a polymer having a melting temperature (Build Material $T_m$) of less than about 153° C. to 173° C., again depending on the toluene sulfonamide or mixture thereof selected for use.

To absorb and convert the light energy to thermal energy, as mentioned, the electromagnetic radiation absorber can be, for example, an infrared-absorbing colorant, such as a near-infrared-absorbing colorant, or can be an energy-absorbing colorant within the visible spectrum, e.g., a carbon black pigment. Infrared absorbing colorants can extend from the nominal red edge of the visible spectrum at 700 nm up to 1 mm, but more particularly, the infrared absorbing colorants, such as dyes, can be used in the jettable fluids in the range of about 800 nm to 1400 nm to convert absorbed light energy to thermal energy. Similar characteristics can be achieved using near-infrared colorants within the range of 950 nm to 1150 nm, for example. When used with a light source that emits a wavelength in this range and a polymeric build material that has a low absorbance in this range, the near-infrared dye can cause the printed portions of the polymer powder to melt and coalesce without melting the remaining polymer powder. Thus, near-infrared dyes can be just as efficient or even more efficient at generating heat and coalescing the polymer powder when compared to carbon black (which is also effective at absorbing light energy and heating up the printed portions of the polymeric build material but has the characteristic of always providing black or gray parts in color).

Infrared colorants, such as near-infrared colorants, used as electromagnetic radiation absorbers can have substantially no impact on the apparent color of the jettable fluid in which it is carried. This allows the formulation of colorless jettable fluids that can be used to coalesce the polymeric build material, but which will not impart any visible color to the part. Alternatively, the jettable fluids can include additional pigments and/or dyes to give the jettable fluid a color such as cyan, magenta, yellow, black, red, orange, green, purple, blue, pink, etc. The colorant can be added to a single jettable fluid with both the electromagnetic radiation absorber and the organic solvent plasticizer, to one or both jettable fluids that contain one of the electromagnetic radiation absorber or the organic solvent plasticizer, or to separate inks that are printed alongside of the electromagnetic radiation absorber and the organic solvent plasticizer. Such jettable fluids can be used to print colored three-dimensional parts with good optical density.

Example near-infrared dyes that can be used include aminium-based near-infrared dyes manufactured by HW Sands Corporation: SDA 1906 ($\lambda_{max}$ absorption 993 nm), SDA 3755 ($\lambda_{max}$ absorption 1049 nm), and SDA 7630 ($\lambda_{max}$ absorption 1070 nm), as well as Ni-dithiolene-based dyes with very low absorption in visible light range, e.g., very low absorbance from 400 nm to 700 nm. However, each of these near-infrared dyes has high absorbance in the range of 800 nm to 1400 nm. Black jettable fluids, on the other hand, with carbon black pigment used as the electromagnetic radiation absorber, have high absorbance within the visible spectrum (and are generally considered to have a broad absorbance spectrum), so depending on the desired result (e.g., black or colorless with the option to add colorant) appropriate absorbers can be selected accordingly. There are other electromagnetic infrared absorbers that can be used that have a broader absorption spectrum in the visible range, but which are not black. Examples include aminium-based water-soluble dyes, tetraphenyldiamine-based water-soluble near-infrared dyes, cyanine-based water-soluble near-infrared dyes, and dithiolene-based water-soluble near-infrared dyes.

In some examples, electromagnetic radiation absorbers can be present in the jettable fluid, whether present with or without the organic solvent plasticizer, at from 0.1 wt % to 10 wt %, from 0.5 wt % to 8 wt %, from 1 wt % to 6 wt %, etc. At these concentrations, the jettable fluid can typically be applied to a layer of the polymeric build material at from 32 CL to 196 CL in order to provide sufficient electromagnetic radiation absorber for effective fusing.

As mentioned, the electromagnetic radiation absorbers can provide a boosting capacity sufficient to increase the temperature of the polymeric build above the melting or softening point of the polymer powder. As used herein, "temperature boosting capacity" refers to the ability of an absorber to convert near-infrared light energy into thermal energy to increase the temperature of the printed polymer powder over and above the temperature of the unprinted portion of the polymer powder. Typically, the polymeric build material or powder can be fused together when the temperature increases to or above the melting or softening temperature of the polymer, but fusion can also occur in some instance below the melting point. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become cake-like. The "softening point," as used herein, refers to the temperature at which the polymer particles coalesce while the remaining powder remains separate and loose.

Although melting point and softening point are often described herein as the temperatures for coalescing the polymer powder, as mentioned, in some cases the polymer particles can coalesce at temperatures slightly below the melting point or softening point. Therefore, as used herein "melting point" and "softening point" can include temperatures slightly lower, such as up to about 5° C. lower than the actual melting point or softening point. Regardless, temperatures below the $T_{max}$ over-fusing temperature can be avoided to the extent possible. For example, even with the expanded temperature processing window provided by the systems and methods of the present disclosure, there may be instances where some over-fusing in certain locations is acceptable in order to achieve a high-density, e.g., 90% or more or 95% or more, along a larger area of the part, so on average, the part density may still be improved compared to parts prepared without the use of an organic solvent plasticizer.

In one example, the electromagnetic radiation absorber can have a temperature boosting capacity from about 5° C. to about 30° C. for a polymer with a melting or softening point from about 75° C. to about 350° C. If the polymeric build material is at a temperature within about 5° C. to about 30° C. of the melting or softening point, then the electromagnetic radiation absorber can boost the temperature of the printed powder up to or above the melting or softening point of the polymeric build material, while the unprinted build material remains at a lower temperature. In some examples, the polymeric build material can be preheated to a temperature from 4° C. to 30° C., from 10° C. to 30° C., or from 10° C. to 20° C. lower than the melting or softening point of the polymer. The jettable fluid(s) can then be printed onto the polymeric build material and irradiated with electromagnetic radiation sufficient to coalesce the printed portion of the polymeric build material. Thus, the electromagnetic radiation absorber provides the temperature boost to the polymeric build material compared to unprinted areas of the polymeric build material, and furthermore, the organic solvent plasticizer provides a reduced melting temperature and reduced melt viscosity sufficient to increase the temperature processing window by more than 2 fold, 3 fold, 4 fold, or 5 fold compared to polymeric build material printed with the same amount of electromagnetic radiation absorber and no organic solvent plasticizer.

The jettable fluid(s) can include other components other than the electromagnetic radiation absorber and the organic solvent plasticizer. As mentioned, the jettable fluids include water, and in some examples as mentioned, can included colorant, e.g., dye and/or pigment to impart color to the fabricated part. Liquid vehicle formulations can be prepared which include other ingredients, such as other organic co-solvents that may not be a plasticizer for the polymeric build material, but which is added in for a different purpose, e.g., jettability, jetting reliability, decap performance, viscosity modification, etc. Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. To the extent these co-solvents act as a temperature reducing plasticizer for a specific polymeric build material, some of these other co-solvents can be considered to be applicable in that context.

Further, one or more non-ionic, cationic, and/or anionic surfactant can be present, ranging from 0.01 wt % to 20 wt %, if present. Examples include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, or the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, various other additives can be employed to enhance properties of the jettable fluids for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof. Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %. The liquid vehicle can also include dispersants if there are solids, such as pigment, that should be dispersed in the jettable fluid for purposes of retaining solid suspension, jettability, etc. In one example, the liquid vehicle can be predominantly water.

The polymeric build material portions printed with the electromagnetic radiation absorber and the organic solvent plasticizer can be irradiated with a fusing lamp configured to emit a wavelength from within the visible spectrum, the near-infrared spectrum, or the infrared spectrum, for example. Suitable fusing lamps can include commercially available infrared lamps and halogen lamps, for example. The fusing lamp can be a stationary lamp or a moving lamp (both of which are shown by way of example in FIG. 1). For example, the lamp can be mounted on a track to move horizontally across the powder bed support. Such a fusing lamp(s) can make multiple passes over the bed depending on the amount of exposure needed to coalesce each printed layer. The fusing lamp(s) can be configured to irradiate the entire powder bed with a substantially uniform amount of energy, but as described herein, it can still be difficult to avoid inhomogeneity across the entire powder bed support. In one example, the fusing lamp can be matched with the electromagnetic radiation absorber so that the fusing lamp emits wavelengths of light that match the highest absorption wavelengths of the absorber. An absorber with a narrow peak at a particular wavelength, e.g., narrow band with the near-infrared range, can be used with a fusing lamp that emits a narrow range of wavelengths at approximately the peak wavelength thereof. Similarly, an electromagnetic radiation absorber that absorbs a broad range of radiation can be used with a fusing lamp that emits a broad range of overlapping wavelengths. Matching the electromagnetic radiation absorber and the fusing lamp in this way can increase an efficiency of coalescing the polymeric build material with the absorber and the plasticizer printed thereon, while the unprinted polymer particles do not absorb as much light and remain at a lower temperature. By way of example, depending on the amount of electromagnetic radiation absorber and organic solvent plasticizer applied to the polymeric build material, the absorbance band of the absorber, the preheat temperature, and the melting or softening point of the build material, an appropriate amount of irradiation can be supplied from the fusing lamp. In some examples, the fusing lamp can irradiate each layer from about 0.5 to about 10 seconds using, for example, two 750-watt bulbs or other similar electromagnetic radiation source.

Figure 6:
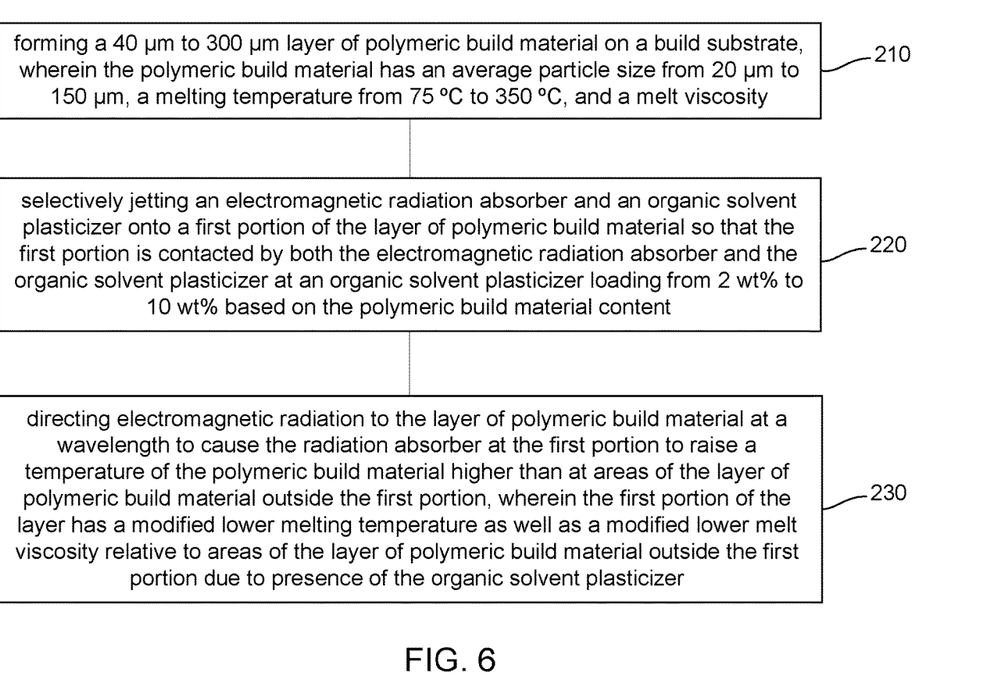
FIG. 6 is a flow diagram of an example method of the present disclosure.

In another example, as shown in FIG. 6, a method of three-dimensional printing 200 can include forming 210 a 40 μm to 300 μm layer of polymeric build material on a build substrate, and selectively 220 jetting an electromagnetic radiation absorber and an organic solvent plasticizer onto a first portion of the layer of polymeric build material so that the first portion is contacted by both the electromagnetic radiation absorber and the organic solvent plasticizer at an organic solvent plasticizer loading from 2 wt % to 10 wt % based on the polymeric build material content. The loading of the electromagnetic radiation absorber in the polymeric build material can be from 0.05 wt % to 2 wt % in some examples. The polymeric build material can have an average particle size from 20 μm to 150 μm, a melting temperature from 75° C. to 350° C., and a melt viscosity. The method can also include directing 230 electromagnetic radiation to the layer of polymeric build material at a wavelength to cause the radiation absorber at the first portion to raise a temperature of the polymeric build material higher than at areas of the layer of polymeric build material outside the first portion. The first portion of the layer can also have a modified lower melting temperature as well as a modified lower melt viscosity relative to areas of the layer of polymeric build material outside the first portion due to presence of the organic solvent plasticizer. In one example, the melt viscosity of the polymeric build material at the first portion where the electromagnetic radiation absorber and the organic solvent plasticizer are printed can be reduced to a lower melt viscosity and the melting temperature of the polymeric build material at the first portion (where printed) can be decreased by 3° C. to 15° C.

The method can also include preheating the polymeric build material to within 4° C. to 30° C. below the modified lower melting temperature prior to exposing the layer of polymeric build material to the electromagnetic radiation. In further detail, the method can also include adding a second layer of the polymeric build material to the layer of polymeric build material after the layer is melted, selectively applying the electromagnetic radiation absorber and the organic solvent plasticizer onto a second portion of the second layer of polymeric build material, and directing the electromagnetic radiation to the second layer of polymeric build material, similar to that described with respect to the earlier applied layer there-beneath. The method can also use some of the same electromagnetic radiation absorbers, organic solvent plasticizers, and polymeric build material described herein. For example, the electromagnetic radiation absorber can be an infrared-absorbing colorant, a near-infrared colorant, or an energy-absorbing colorant within the visible spectrum, e.g., carbon black pigment. The organic solvent plasticizer can be p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, or a mixture thereof. The polymeric build material can be nylon 6, nylon 8, nylon 9, nylon 11, nylon 12, nylon 66, nylon 612, nylon 812, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, and copolymers thereof. In one example, the electromagnetic radiation absorber and the organic solvent plasticizer can be selectively applied to the layer of polymeric build material from separate jettable fluids, e.g., from separate fluidjet pens.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle" refers to a liquid fluid colorant, electromagnetic radiation absorber, and/or organic solvent plasticizer as carried along with water and in some examples, other components. A wide variety of liquid vehicles may be used with the systems and methods of the present disclosure, including, surfactants, solvents, co-solvents, anti-kogation agents, buffers, biocides, sequestering agents, viscosity modifiers, surface-active agents, water, etc.

As used herein, "jetting" or "jettable" refers to compositions that are ejectable from jetting architecture, such as ink-jet architecture. Ink-jet architecture can include thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Over 50 bricks having dimensions of about 15 mm×7.5 mm×5 mm (x, y, z, respectively) were printed using a multi-jet fusion printer. Instead of relying upon the thermal inhomogeneities of the printer bed or build substrate to evaluate fusion and to determine temperature processing windows, melt viscosities, melt temperatures, etc., the bricks (or "parts") were artificially made to be printed at different maximum temperatures. This mimicked the effect of thermal inhomogeneity often present within build material layers on a printer bed, while providing a method to more easily evaluate a wider temperature range in a more direct manner. More specifically, in order to achieve different maximum temperatures for the various printed parts, different amounts of electromagnetic radiation absorber (referred to in these examples as "fusing agent") was used for various samples. This was done both with parts having no organic solvent plasticizer, as well as with parts having a 128 Contone Level of organic solvent plasticizer. The parts are referred to hereinafter as "comparative parts" (parts with no plasticizer) and "128 CL parts" (parts with 128 CL of plasticizer). Printing conditions were modified slightly between the different runs, with the 128 CL parts being printed with slower fusing lamp speeds used to heat up the 128 CL parts after initial loading. Thus, there can be two different materials found in each brick, included at different concentrations. All sample parts were prepared using a fusing agent, albeit various parts being prepared at various concentrations of fusing agent. The fusing agent provided fusing of the layer of polymer build material upon exposure to electromagnetic radiation appropriate for generating heat at the fusing agent (within the layer of polymeric build material), e.g., in this example where the electromagnetic radiation absorber was carbon black. Furthermore, some parts were prepared with organic solvent plasticizer (128 CL parts) and others were prepared without organic solvent plasticizer (comparative parts). The fluid jetting conditions used to generate the parts included a two-pass ejection or printing mode with multiple fusing lamps cycled on and off during different stages of the build to generate fusing. The fusing lamps emitted electromagnetic radiation at a range between 200-3000 nm, with a peak at about 1000 nm, correlating to a blackbody radiation curve with a color temperature of 2700K and powered at 750 W. This wavelength range and intensity was suitable to generate heat at the carbon black pigment fusing agent that was jetted into a top layer of the polymeric build material at a 32 contone level (CL).

Figure 7:
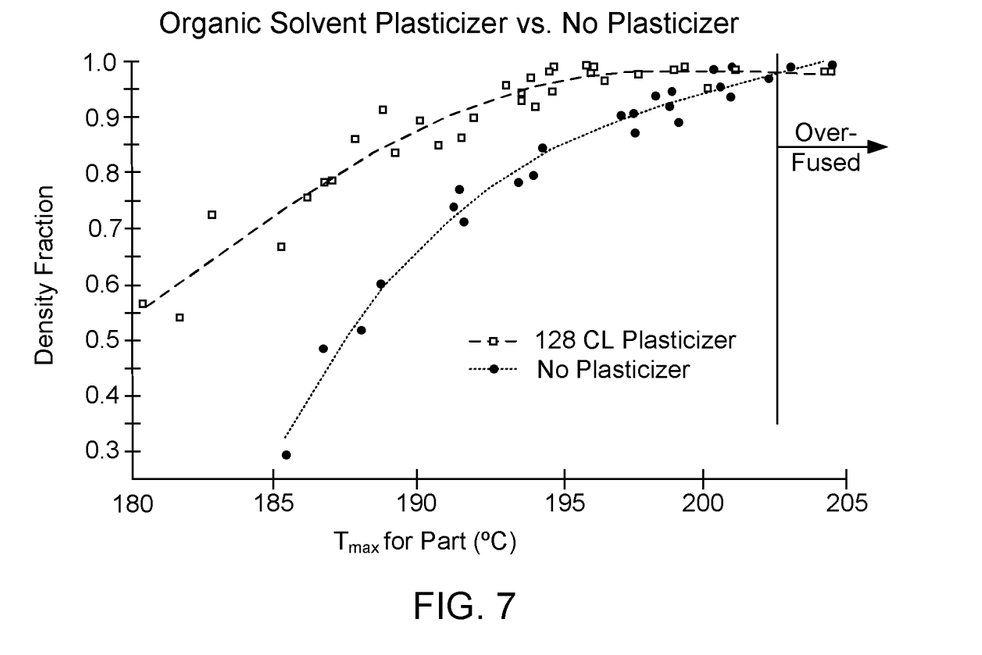
FIG. 7 schematically illustrates by way of an example graph improved selectivity on voxels processed with organic solvent plasticizer compared to voxels without plasticizer applied in accordance with the present disclosure.

In this example, the fusing agent was ejected separately relative to the organic solvent plasticizing agent (two separate jettable fluids), but could be co-formulated together in a single jettable fluid, depending on the specific application. More specifically, the jettable fusible fluid included 4 wt % carbon black in the jettable fusing fluid and the jettable plasticizer fluid included 21 wt % toluene sulfonamide. The build material layer thickness was spread and flattened to about 80 μm per layer, and the operating temperature of the multi-jet fusion printer at the powder bed build material (to be distinguished from the higher fusing temperatures used to fuse the layers as shown in FIG. 7) ranged from about 136° C. to 150° C. during different stages of the build, e.g., build material spreading, printing, waiting, evaluating temperatures, etc.

During preparation of the various parts, the maximum temperatures (or fusing temperatures) for each part was recorded during the print cycle. Maximum temperatures were recorded over 3 layers and averaged to determine the average maximum temperature that each printed part reached during printing. After printing, part densities and dimensions were recorded. Any part that was >3% in size over any one dimension of the specified part dimensions were deemed "over-fused." This criteria were used to set the upper temperature limit for the part manufacturing window. Parts were then plotted, as shown in FIG. 7, comparing Density Fraction with maximum temperature ($T_{max}$). The "over-fused" parts were identified and are also delineated in FIG. 7. The 128 CL parts exhibited a lower "over-fused" temperature compared to the comparative parts, so the data was shifted by 3.7° C. to account for the difference in the temperature over which parts became over-fused (e.g., related to the slower processing time and higher lamp irradiance onto the build bed).

There was a dramatic difference between the 128 CL PFA parts and the comparative parts, with the 128 CL PFA parts having much higher densities at temperatures further away from the over-fusing temperature relative to the comparative parts. With this data, a temperature processing window (or high-density fusion window) can be established based on parts exhibiting two physical properties, namely acceptable print density fraction (above a certain desired threshold) and parts that are not over-fused. For example, a part prepared having a density fraction of 0.95 or more, or 95% dense or more and which is not over-fused can be said to provide acceptable part consistency in one example. In another example, 90% dense parts may be an acceptable minimum threshold, depending on the application. Regardless, parts that are not over-fused, and which have a desired minimum density, can be prepared with more room for temperature processing error when the organic solvent plasticizer is used, as apparent from the data provided in FIG. 7. It should be noted that the intrinsic density parts loaded with organic solvent plasticizer can be higher as well due to the higher density of the organic solvent plasticizer in some examples. As the loading of the plasticizer within the final part was calculated, the densities provided reflect this higher intrinsic density of the parts loaded with the organic solvent plasticizer. As can be seen in FIG. 7, there are many more 128 CL parts that exceeded 90% density and 95% density than there were comparative parts, and these higher densities were achieved at lower temperatures (even considering the 3.7° C. over-fusing shift described above that occurred for the 128 CL parts). Consistent with this data, the respective temperature processing windows (or temperature range producing 90% or 95% (or more) density parts) was determined, and is provided in Table 1, as follows:

TABLE 1

Temperature Processing Windows

| Organic Solvent Plasticizer Loading | Comparative Parts | 128 CL Parts |
|---|---|---|
| 95% dense (0.95 Density Fraction) | 2.2° C. | 8.8° C. |
| 90% dense (0.90 Density Fraction) | 5.2° C. | 12.0° C. |

In further detail, as the maximum temperature is increased and there is a decrease in organic solvent plasticizer, there is less room for error regarding obtaining high-density parts while, at the same time, not over-fusing the parts. This is illustrated in Table 1 as it relates to an operational temperature processing window but is also more specifically shown by the multiple data points provided in FIG. 7. Furthermore, as the temperature is dropped below the over-fusing temperature to within a desired temperature processing window, without the organic solvent plasticizer, the density drops off fairly drastically and fairly quickly, with just a few degrees to drop below 95% density, a few more degrees to drop below 90% density, and then the drop off becomes more significant very quickly. With the organic solvent plasticizer, on the other hand, 95% density parts can be prepared within a larger temperature range with essentially no drop across an 8° C. range.

Example 2

Figure 8:
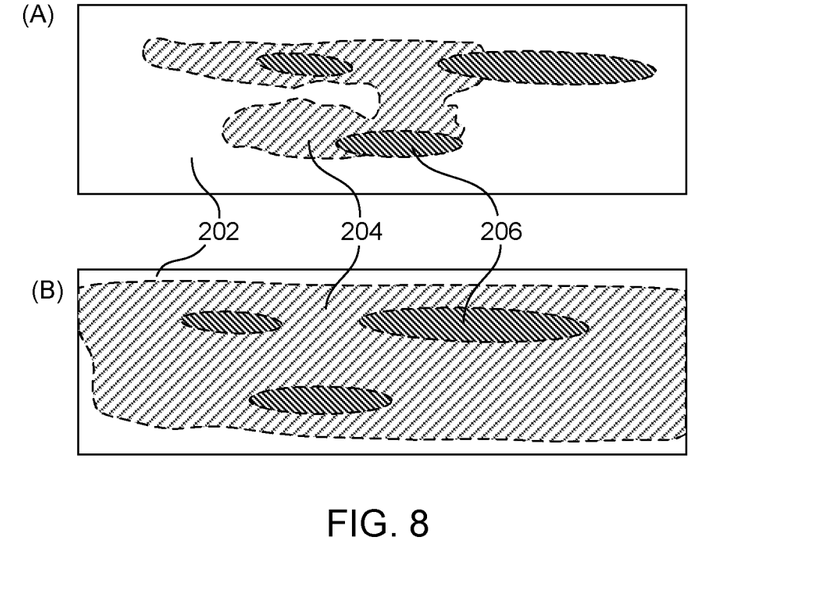
FIG. 8 schematically shows thermal imaging regions of a build material bed or substrate including locations of under-fusing, high-density fusing, and over-fusing with and without organic solvent plasticizer in accordance with the present disclosure.

To visualize the difference between the effect of a narrow temperature processing window and a broader temperature processing window, a model can be considered with a window of 2.2° C. (no plasticizer) vs. 8.5° C. (with plasticizer) for achieving 95% part density. An 8.5° C. window in this example is used rather than an 8.8 C window of Example 1 based on an image processing software limitation that did not allow for 8.8° C. to be used. Thermal images of various build material beds or substrates were analyzed to show the amount of thermal non-uniformity that can exist across the surface of the substrate. Assuming the same fusing agent loading (and therefore essentially the same temperature rise occurring during fusing lamp passes), imagery was collected with these temperature tolerances or temperature processing window ranges in mind. Outline drawings approximating the thermal imaging are shown at FIG. 8. Image A represents where appropriate fusing would occur with a 2.2° C. temperature processing window. More specifically, area 202 remained gray on the thermal imaging and represented areas where fusion would likely not occur; area 204 was green on the thermal imaging and represented areas where appropriate fusion would likely occur; and area 206 was red on the thermal imaging and represented areas where over-fusing would likely occur based on the narrow processing temperature window. On the other hand, image B represents where appropriate fusing would occur with an 8.5° C. temperature processing window. Again, area 202 remained gray on the thermal imaging and represented areas where fusion would likely not occur; area 204 was green on the thermal imaging and represented areas where appropriate fusion would likely occur; and area 206 was red on the thermal imaging and represented areas where over-fusing would likely occur based on the narrow temperature processing window. Thus, there would be much more area where appropriate fusion would occur (e.g., at 204) with about the same amount of over-fusion (e.g., 206) and much less under-fusing (e.g., 202).

In this specific example, the "over-fusing" threshold shown at 206 related for both images A and B indicated a $T_{max}$ for over-fusing at about 162° C. However, with respect to image A (with the narrower temperature processing window), the temperature at which fusing would occur, shown at 204, was at about 159.8° C., providing only a 2.2° C. temperature window. Image B, however, would provide a temperature for fusing starting at about 153.5° C., providing an 8.5° C. temperature window at which fusing would occur, also shown at 204. Thus, by widening the temperature processing window, with similar heating profiles, a much greater percentage of the build material can form a part at higher density.

Example 3

Figure 9:
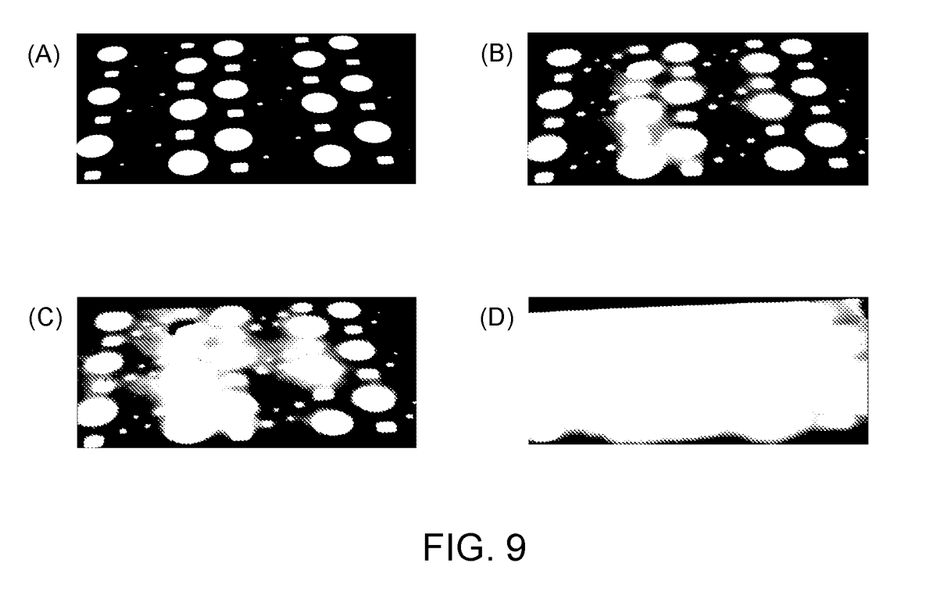
FIG. 9 provides black and white thermal images of a build material bed or substrate including locations of under-fusing (black) and high-density fusing (white) in accordance with the present disclosure.

Similar to FIG. 8 shown in Example 2, FIG. 9 depicts thermal imaging illustrating the inhomogeneities which can exist at multi-jet fusion print beds. The white dots in (A) were regions where parts were being printed. These areas tend to be hot due to the elevated temperatures used to fuse the parts. Image A is an original thermal image used for reference, converted from gray scale to black and white (black areas originally appeared medium gray and white areas appeared white to light gray). Images B-D highlight how an organic solvent plasticizing agent can provide a larger printing window, and thus, a lower degree of inhomogeneity, across the build material substrate (and thus, the build material). In images B-D, black regions indicate areas that could under-fuse and white regions indicate areas that would likely be appropriately fused. Image B ($T_{max}$: T>158.9° C.); Image C ($T_{max}$-2.2° C.: T>156.7° C.); and Image D ($T_{max}$-8.8° C.: T>150.1° C.).

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A three-dimensional printing system, comprising:
    a polymeric build material having an average particle size from 20 µm to 150 µm, a first melt viscosity, and a melting temperature from 75° C. to 350° C.; and
    jettable fluid including water, from 0.1 wt % to 10 wt % of electromagnetic radiation absorber, and from 10 wt % to 35 wt % of an organic solvent plasticizer, wherein upon contacting a first portion of a layer of the polymeric build material with the jettable fluid to provide an organic solvent plasticizer loading in the polymeric build material at from 2 wt % to 10 wt %, the first melt viscosity of the polymeric build material at the first portion is lowered to a second melt viscosity and the melting temperature of the polymeric build material at the first portion is decreased by 3° C. to 15° C., wherein the polymeric build material at the first portion of the layer when also loaded with 0.05 wt % to 2 wt % of the electromagnetic radiation absorber based on the polymeric build material content, a $T_{max}$ over-fusing temperature and a temperature processing window are established, and wherein the temperature processing window extends from the $T_{max}$ over-fusing temperature to from 5° C. to 20° C. below the $T_{max}$ over-fusing temperature.

2. The three-dimensional printing system of claim 1, wherein the electromagnetic radiation absorber is an infrared-absorbing colorant, a near-infrared-absorbing colorant, or a colorant within the visible spectrum.

3. The three-dimensional printing system of claim 1, further comprising an electromagnetic radiation source to direct electromagnetic radiation toward a top layer of the polymeric build material, wherein the electromagnetic radiation source emits a wavelength of energy to generate heat using the electromagnetic radiation absorber.

4. The three-dimensional printing system of claim 1, wherein the organic solvent plasticizer is p-toluene sulfonamide, m-toluene sulfonamide, o-toluene sulfonamide, urea, ethylene carbonate, propylene carbonate, diethylene glycol, triethylene tetraethylene glycol, methyl 4-hydroxybenzoate, dimethyl sulfoxide, dioctyl phthalate, gamma-butyrolactone, or a mixture thereof; and wherein the polymeric build material is polyethylene, polyacrylate, polypropylene, polyester, thermoplastic polyurethane, engineering plastic, polymer blends thereof, amorphous polymers thereof, core-shell polymers thereof, and copolymers thereof.

5. A three-dimensional printing system, comprising:
a polymeric build material having an average particle size from 20 µm to 150 µm, a first melt viscosity, and a melting temperature from 75° C. to 350° C.;
a jettable fusing fluid including water and from 0.1 wt % to 10 wt % electromagnetic radiation absorber; and
a jettable plasticizing fluid including water and from 10_wt % to 35 wt % of an organic solvent plasticizer,
wherein upon contacting a first portion of a layer of the polymeric build material with the jettable fusing fluid and the jettable plasticizing fluid to provide an organic solvent plasticizer loading of 2 wt % to 10 wt % based on the polymeric build material content, the first melt viscosity of the polymeric build material at the first portion is reduced to a second lower melt viscosity and the melting temperature of the polymeric build material at the first portion is decreased by 3° C. to 15° C., wherein the polymeric build material at the first portion of the layer when also loaded with 0.05 wt % to 2 wt % of the electromagnetic radiation absorber based on the polymeric build material content, a $T_{max}$ over-fusing temperature and a temperature processing window are established, and wherein the temperature processing window extends from the $T_{max}$ over-fusing temperature to from 5° C. to 20° C. below the $T_{max}$ over-fusing temperature.

6. The three-dimensional printing system of claim 5, wherein the electromagnetic radiation absorber is an infrared-absorbing colorant, a near-infrared-absorbing colorant, or an energy-absorbing colorant within the visible spectrum.

7. The three-dimensional printing system of claim 5, further comprising an electromagnetic radiation source to direct electromagnetic radiation toward a top layer of the polymeric build material, wherein the electromagnetic radiation source emits a wavelength of energy to generate heat using the electromagnetic radiation absorber.

8. The three-dimensional printing system of claim 5, wherein the organic solvent plasticizer is p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, or a mixture thereof, and wherein the polymeric build material is polyethylene, polyacrylate, polypropylene, polyester, thermoplastic polyurethane, engineering plastic, polymer blends thereof, amorphous polymers thereof, core-shell polymers thereof, and copolymers thereof.

9. A method of three-dimensional printing, comprising:
forming a 40 µm to 300 µm layer of polymeric build material on a build substrate, wherein the polymeric build material has an average particle size from 20 µm to 150 µm, a melting temperature from 75° C. to 350° C., and a melt viscosity;
selectively jetting an electromagnetic radiation absorber and an organic solvent plasticizer onto a first portion of the layer of polymeric build material so that the first portion is contacted by both the electromagnetic radiation absorber and the organic solvent plasticizer at an organic solvent plasticizer loading from 2 wt % to 10 wt % based on the polymeric build material content, wherein jetting the electromagnetic radiation absorber and the organic solvent plasticizer is from either:
a jettable fluid including water, from 0.1 wt % to 10 wt % of the electromagnetic radiation absorber, and from 10 wt % to 35 wt % of the organic solvent plasticizer; or
multiple fluids comprising i) a jettable fusing fluid including water and from 0.1 wt % to 10 wt % the electromagnetic radiation absorber, and ii) a jettable plasticizing fluid including water and from 10 wt % to 35 wt % of the organic solvent plasticizer; and
directing electromagnetic radiation to the layer of polymeric build material at a wavelength to cause the radiation absorber at the first portion to raise a temperature of the polymeric build material higher than at areas of the layer of polymeric build material outside the first portion, wherein the first portion of the layer has a modified lower melting temperature as well as a modified lower melt viscosity relative to areas of the layer of polymeric build material outside the first portion due to presence of the organic solvent plasticizer, wherein the polymeric build material at the first portion of the layer when also loaded with 0.05 wt % to 2 wt % of the electromagnetic radiation absorber based on the polymeric build material content, a $T_{max}$ over-fusing temperature and a temperature processing window are established, and wherein the temperature processing window extends from the $T_{max}$ over-fusing temperature to from 5° C. to 20° C. below the $T_{max}$ over-fusing temperature.

10. The method of claim 9, further comprising preheating the polymeric build material to within 4° C. to 30° C. below the modified lower melting temperature prior to exposing the layer of polymeric build material to the electromagnetic radiation.

11. The method of claim 9, further comprising:
adding a second layer of the polymeric build material to the layer of polymeric build material after the layer is melted;

selectively applying the electromagnetic radiation absorber and the organic solvent plasticizer onto a second portion of the second layer of polymeric build material; and directing the electromagnetic radiation to the second layer of polymeric build material.

12. The method of claim 9, wherein the organic solvent plasticizer has a vapor pressure from 0 mmHg to 25 mmHg at 170° C.

13. The method of claim 9, wherein the electromagnetic radiation absorber and the organic solvent plasticizer added to the layer of polymeric build material are respectively selectively jetted from separate jettable fluids.

14. The method of claim 9, wherein the electromagnetic radiation absorber is an infrared-absorbing colorant, a near-infrared-absorbing colorant, or an energy-absorbing colorant within the visible spectrum.

15. The method of claim 9, wherein the organic solvent plasticizer is p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, or a mixture thereof, and wherein the polymeric build material is polyethylene, polyacrylate, polypropylene, polyester, thermoplastic polyurethane, engineering plastic, polymer blends thereof, amorphous polymers thereof, core-shell polymers thereof, and copolymers thereof.

16. The method of claim 9, wherein the polymeric build material is nylon 6, nylon 8, nylon 9, nylon 11, nylon 12, nylon 66, nylon 612, nylon 812, polyethylene terephthalate (PET), polystyrene, polyacetal, polycarbonate, acrylonitrile butadiene styrene, polyetheretherketone (PEEK), polymer blends thereof, amorphous polymers thereof, core-shell polymers thereof, and copolymers thereof.

17. The three-dimensional printing system of claim 1, wherein the polymeric build material is nylon 6, nylon 8, nylon 9, nylon 11, nylon 12, nylon 66, nylon 612, nylon 812, polyethylene terephthalate (PET), polystyrene, polyacetal, polycarbonate, acrylonitrile butadiene styrene, polyetheretherketone (PEEK), polymer blends thereof, amorphous polymers thereof, core-shell polymers thereof, and copolymers thereof.

18. The three-dimensional printing system of claim 5, wherein the polymeric build material is nylon 6, nylon 8, nylon 9, nylon 11, nylon 12, nylon 66, nylon 612, nylon 812, polyethylene terephthalate (PET), polystyrene, polyacetal, polycarbonate, acrylonitrile butadiene styrene, polyetheretherketone (PEEK), polymer blends thereof, amorphous polymers thereof, core-shell polymers thereof, and copolymers thereof.

* * * * *